United States Patent
Vrame et al.

(10) Patent No.: US 9,145,985 B2
(45) Date of Patent: Sep. 29, 2015

(54) TRAPEZE CONDUIT SUPPORT SYSTEM

(71) Applicants: Peter A. Vrame, Elk Grove Village, IL (US); Paul A. Vrame, Crystal Lake, IL (US)

(72) Inventors: Peter A. Vrame, Elk Grove Village, IL (US); Paul A. Vrame, Crystal Lake, IL (US)

(*) Notice: Subject to any disclaimer, the term of this patent is extended or adjusted under 35 U.S.C. 154(b) by 248 days.

(21) Appl. No.: 13/845,301

(22) Filed: Mar. 18, 2013

(65) Prior Publication Data

US 2014/0259610 A1    Sep. 18, 2014

(51) Int. Cl.
*F16L 3/12* (2006.01)
*F16L 3/10* (2006.01)
*F16L 3/223* (2006.01)

(52) U.S. Cl.
CPC ............... *F16L 3/105* (2013.01); *F16L 3/2235* (2013.01); *Y10T 29/4998* (2015.01); *Y10T 29/49826* (2015.01); *Y10T 29/49895* (2015.01); *Y10T 29/49899* (2015.01); *Y10T 29/49947* (2015.01)

(58) Field of Classification Search
CPC .. F16L 3/105; F16L 3/2235; Y10T 29/49826; Y10T 29/49895; Y10T 29/49899; Y10T 29/49947; Y10T 29/49998
See application file for complete search history.

(56) References Cited

U.S. PATENT DOCUMENTS 5,971,329 A * 10/1999 Hickey .................. 248/68.1
D448,650 S    10/2001 Vrame
D635,447 S * 4/2011 Henry ..................... D8/356

* cited by examiner

*Primary Examiner* — John C Hong
(74) *Attorney, Agent, or Firm* — Wood, Phillips, Katz, Clark & Mortimer

(57) ABSTRACT

A trapeze conduit support system includes a support bracket, and a moveable retention member, which are configured to be suspended from and carried by a pair of vertically extending support members, such as for mounting of conduits at or near a ceiling, beam, or like supporting structure of an installation. The retention member is moveable between a first, open position, wherein the conduits can be "laid in" to the support bracket, and a second, closed position wherein the retention member retains the conduits in position within the support bracket. Convenient and efficient installation of conduits is thus facilitated.

11 Claims, 6 Drawing Sheets

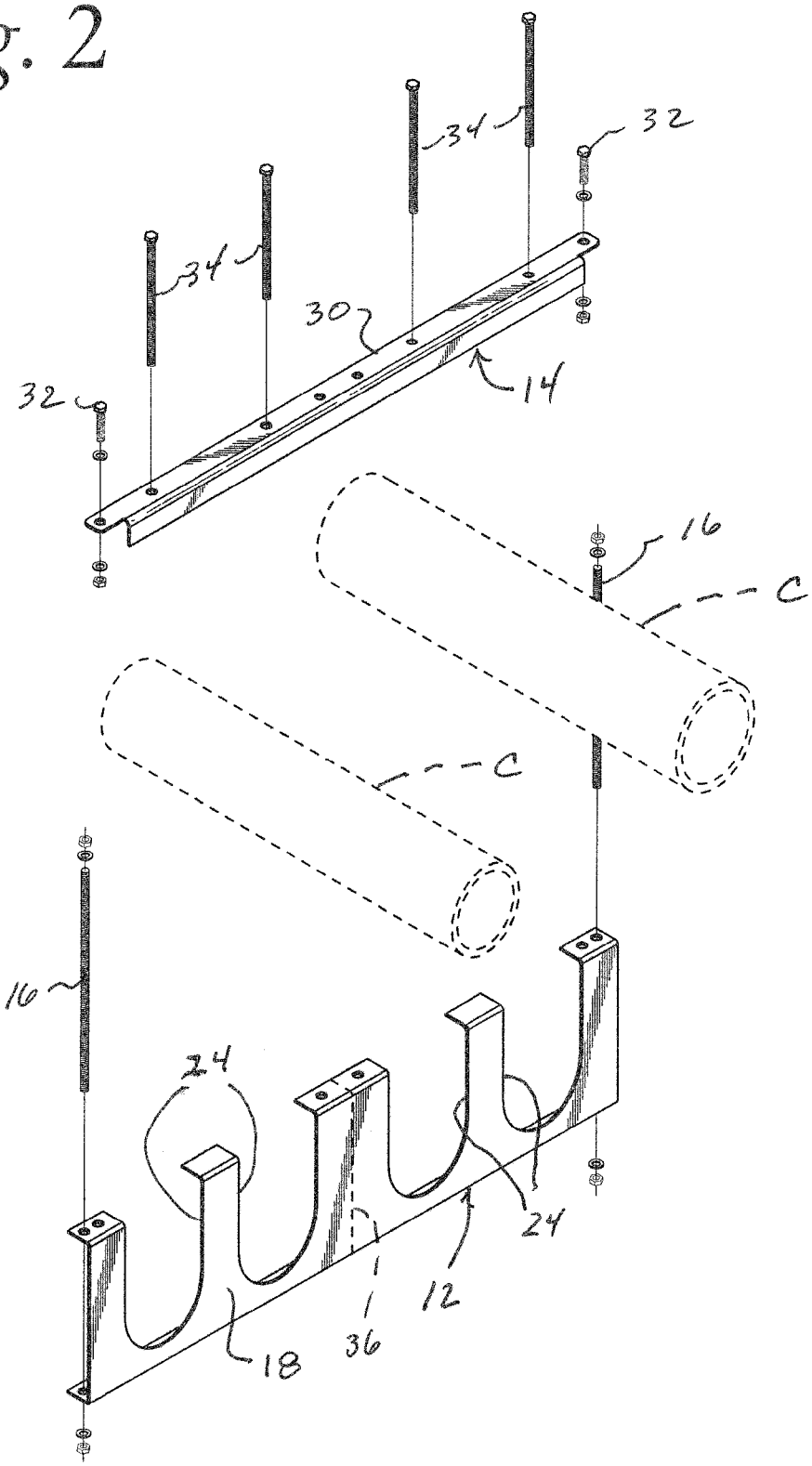

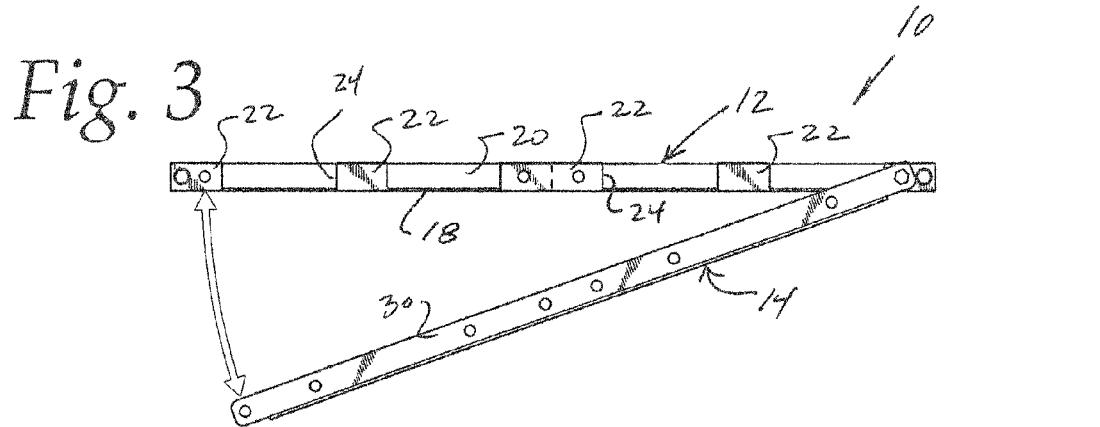
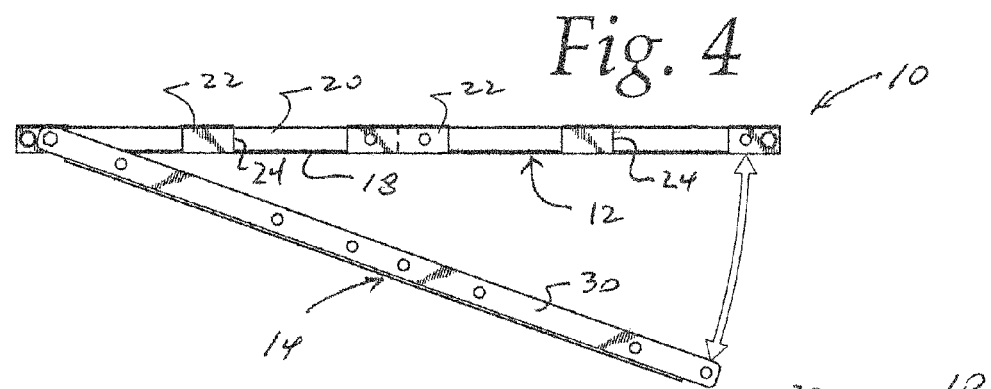
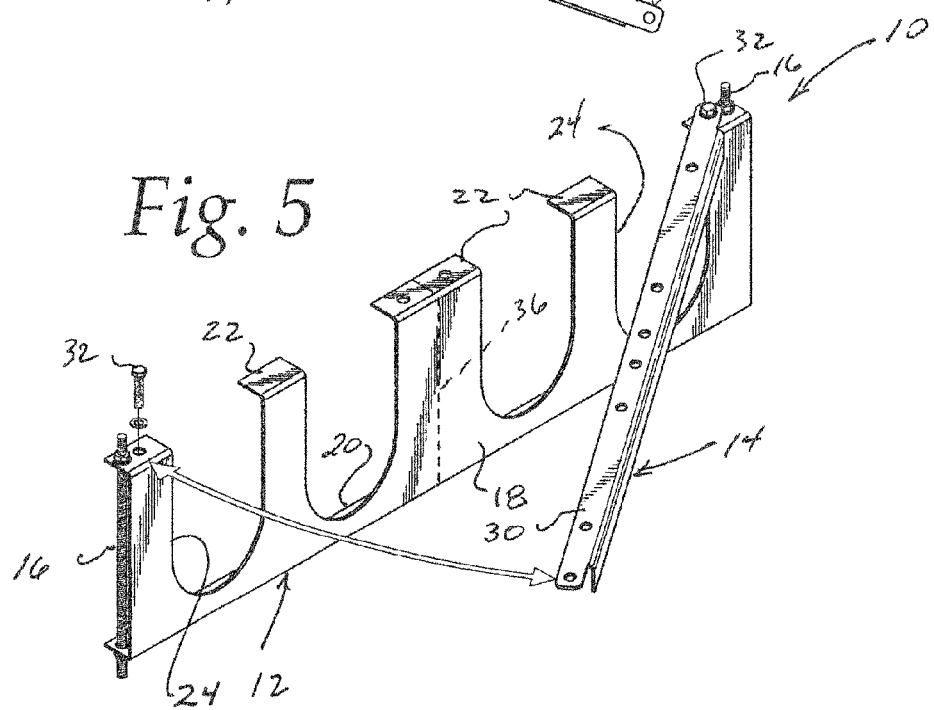

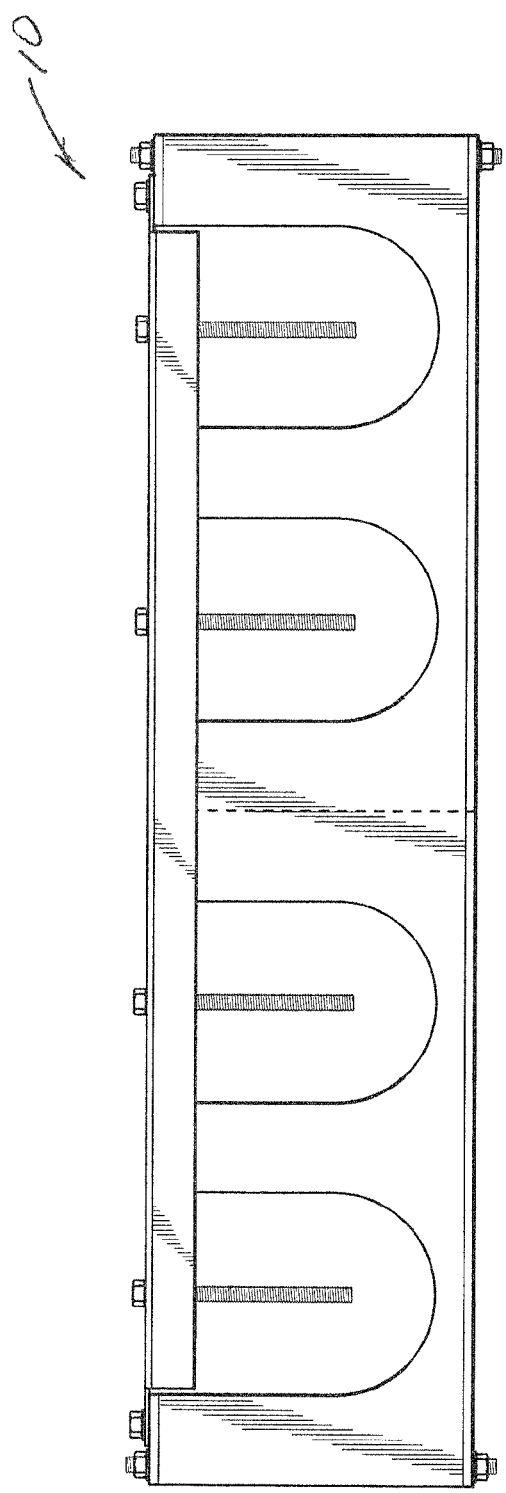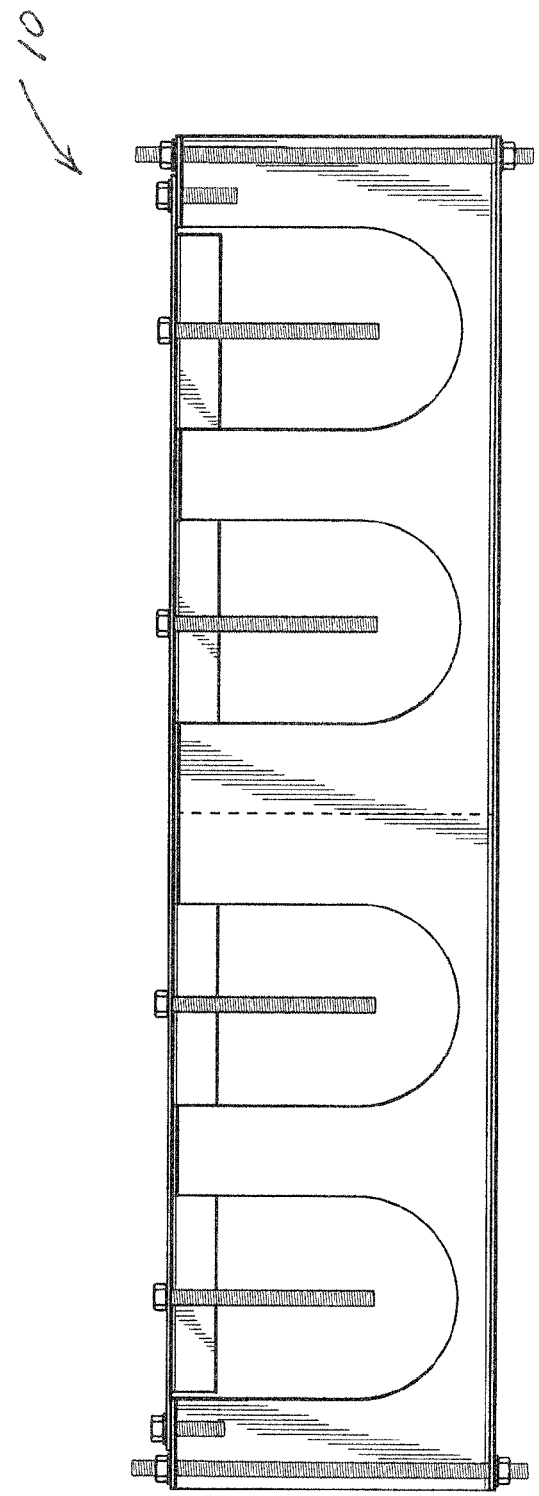
Fig. 7
Fig. 8

TRAPEZE CONDUIT SUPPORT SYSTEM

The present invention relates generally to a system for supporting a plurality of conduits in a building or like structure, and more particularly to a trapeze conduit support system which includes a conduit support bracket, and associated movable retention member, which cooperate to permit efficient placement of conduits in the support bracket, with the conduits thereafter being securely maintained in position. A method of using the present conduit support system is also disclosed.

BACKGROUND OF THE INVENTION

In the typical building, stadium, factory, or the like, it is frequently necessary to support a large number of tubular conduits from the associated structural components of the building. Frequently, the structure includes a vertically extending supports, typically threaded steel rods, from which suitable brackets can be suspended for holding the associated conduits in parallel relationship to each other. In some applications, the brackets can be provided in a vertically stacked arrangement, whereby plural groups of conduits can be supported, one group above the other, from the ceiling or other location in the structure, as desired.

Heretofore, these types of support arrangements have included support brackets having a generally U-shaped cross-sectional configuration, with a web portion of the bracket defining a plurality of laterally spaced opening. For use, the support bracket is mounted at its ends to the typical vertical support elements, and individual conduits inserted and "threaded through" the openings defined by the support bracket.

As will be appreciated, assembly in this manner can be time consuming and difficult. In some instances, the conduits may be a number of feet in length, and thus, inserting and feeding each conduit through the associated support bracket can be cumbersome. Aligning and positioning each conduit through more than one support bracket, as may be necessary for providing proper structural support, can further conplicate installation. Because these type of arrangements are frequently positioned at or near the ceiling of a structure, installation can be further complicated as installers work from a ladder, scaffolding, or platforms.

The present invention contemplates an arrangement for supporting plural conduits such as from the ceiling or the like of an associated structure, wherein installation and secure mounting of the conduits is greatly facilitated.

SUMMARY OF THE INVENTION

A trapeze conduit support system embodying the principles of the present invention is specifically configured to facilitate efficient installation of plural conduits such as at or near the ceiling of an associated structure. The system includes a conduit support bracket which is positioned to extend between and be suspended from a pair of associated vertical supports, such as suitable threaded rods or the like. The conduit support bracket defines a plurality of laterally spaced openings for respectively receiving the associated conduits. The system further includes a selectively moveable retention member which can be positioned to overlie the support bracket after the conduits have been positioned therein. The retention member acts to retain the conduits in the desired position, with its selectively moveable configuration avoiding the need to insert and "thread" the conduits through the support bracket.

In accordance with the illustrated embodiment, the present conduit support system includes a pair of vertically extending support members, which may extend downwardly from a ceiling, a beam, or like supporting structure in a building or other installation.

The system further includes a conduit support bracket which extends between the pair of vertically extending support members. The support bracket is suspended from the vertically extending support members at respective opposite ends of the support bracket.

In the illustrated embodiment, the conduit support bracket comprises a web portion defining a plurality of laterally spaced opening for respectively receiving a plurality of associated conduits.

The present system further includes a selectively moveable retention member joined to the conduit support bracket at one of the ends of the support bracket. Notably, the retention member is moveable from: (1) a first, open position wherein the plurality of conduits can be selectively positioned in the laterally spaced openings of the support bracket, and (2) a second, closed position wherein the support member overlies the conduit support bracket to retain each of the conduits in position within a respective one of the laterally spaced openings defined by the support bracket.

By this arrangement, installation of the conduits is greatly facilitated, since each conduit can be "laid into" the associated support bracket, rather than "threaded through" the support bracket by insertion of the end of each conduit through the bracket.

In the preferred embodiment, the retention member includes a plurality of adjustable locking elements which can be adjusted to respectively engage the conduits in the second, closed position of the retention member. By this arrangement, the conduits are retained in position within the respective opening defined by the web portion of the conduit support bracket. Each of the adjustable locking elements may comprise a suitable, threaded mechanical fastener which can be threadably adjusted vertically through the retention member.

In the illustrated embodiment, the retention member has an L-shaped cross-sectional configuration, including an upper leg portion on which the adjustable locking elements are adjustably mounted.

In the illustrated embodiment, the retention member includes a mechanical fastener at one thereof for mounting the retention member on the conduit support bracket for pivotal movement. By this arrangement, the retention member is moveable between the first and second positions with respect to the support bracket. This permits the retention member to be preassembled on the support bracket prior to placement and positioning of the associated conduits in the support bracket. With the conduits in position, the retention member can easily be pivoted to overlie the support bracket. A plurality of laterally spaced mechanical fasteners are preferably provided which extend through the retention member, and can be secured to the upper leg portion of the support bracket for securing the retention member in the second position thereof on the support bracket.

A method of using the present system will be readily appreciated. The retention member can be secured for pivotal movement on the support bracket, and the support bracket thereafter suspended from the associated pair of vertically extending support members. The associated conduits can then easily be positioned or "laid in" the support bracket, with the retention member thereafter moveable from its first position to its second position, for retaining each of the conduits in position within a respective one of the laterally spaced openings defined by the support bracket. As noted, the retention member is preferably provided with a plurality of adjustable locking elements, which can then be adjusted to respectively engage the conduits when the retention member is in its second, closed position.

Other features and advantages of the present invention will become readily apparent from the following detailed description, the accompanying drawings and the appended claims.

BRIEF DESCRIPTION OF THE DRAWINGS

FIG. 2 is an exploded, perspective view of the present conduit support system;

FIG. 3 is a top view of the present conduit support system;

FIG. 4 is a top view of the present conduit support system;

FIG. 5 is a further perspective view illustrating further features of the present conduit support system;

FIG. 7 is a front elevational view thereof;

FIG. 8 is a rear elevational view thereof;

DETAILED DESCRIPTION

Figure 1:
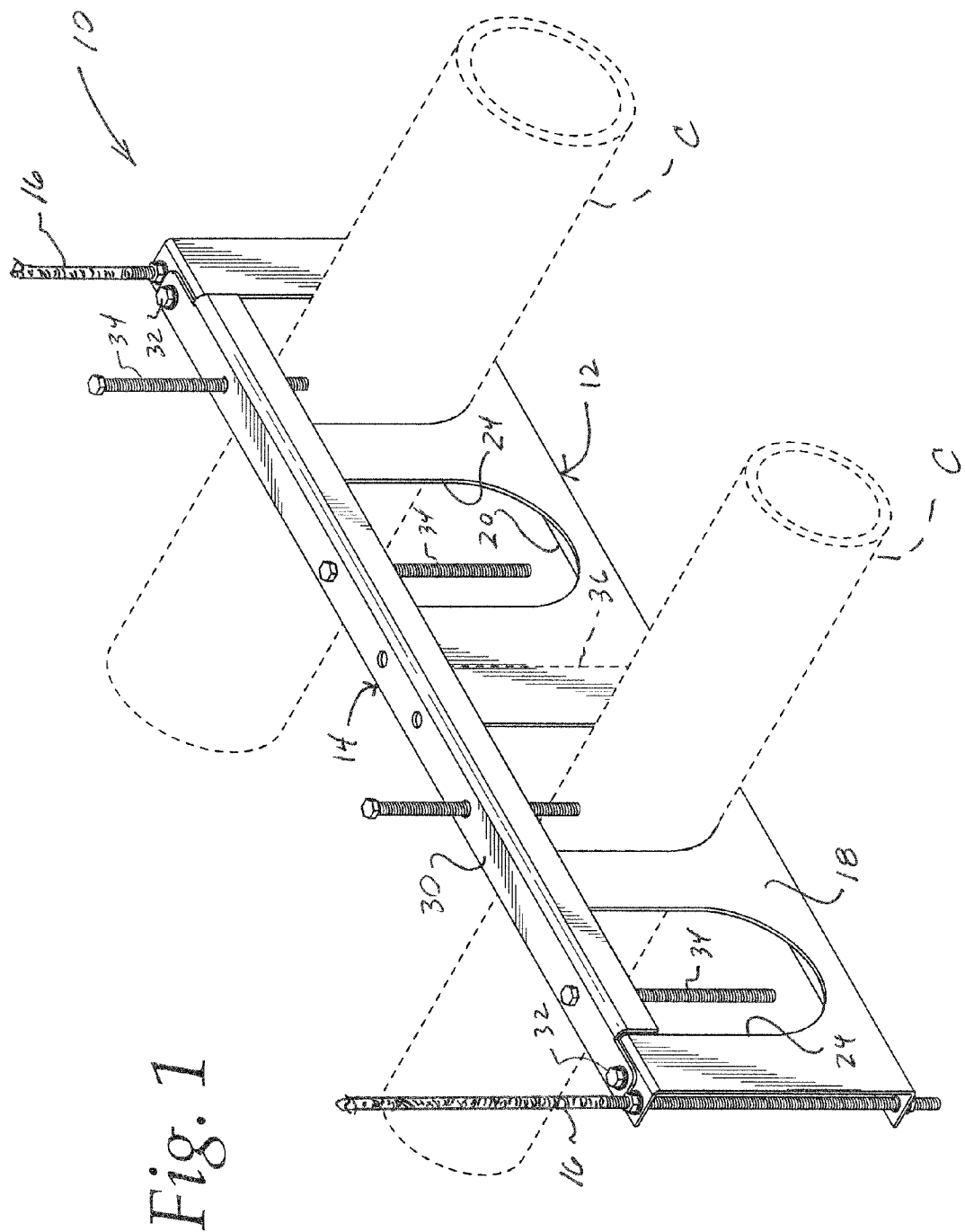
FIG. 1 is a perspective view of a trapeze conduit support system embodying the principals of the present invention.
Figure 6:
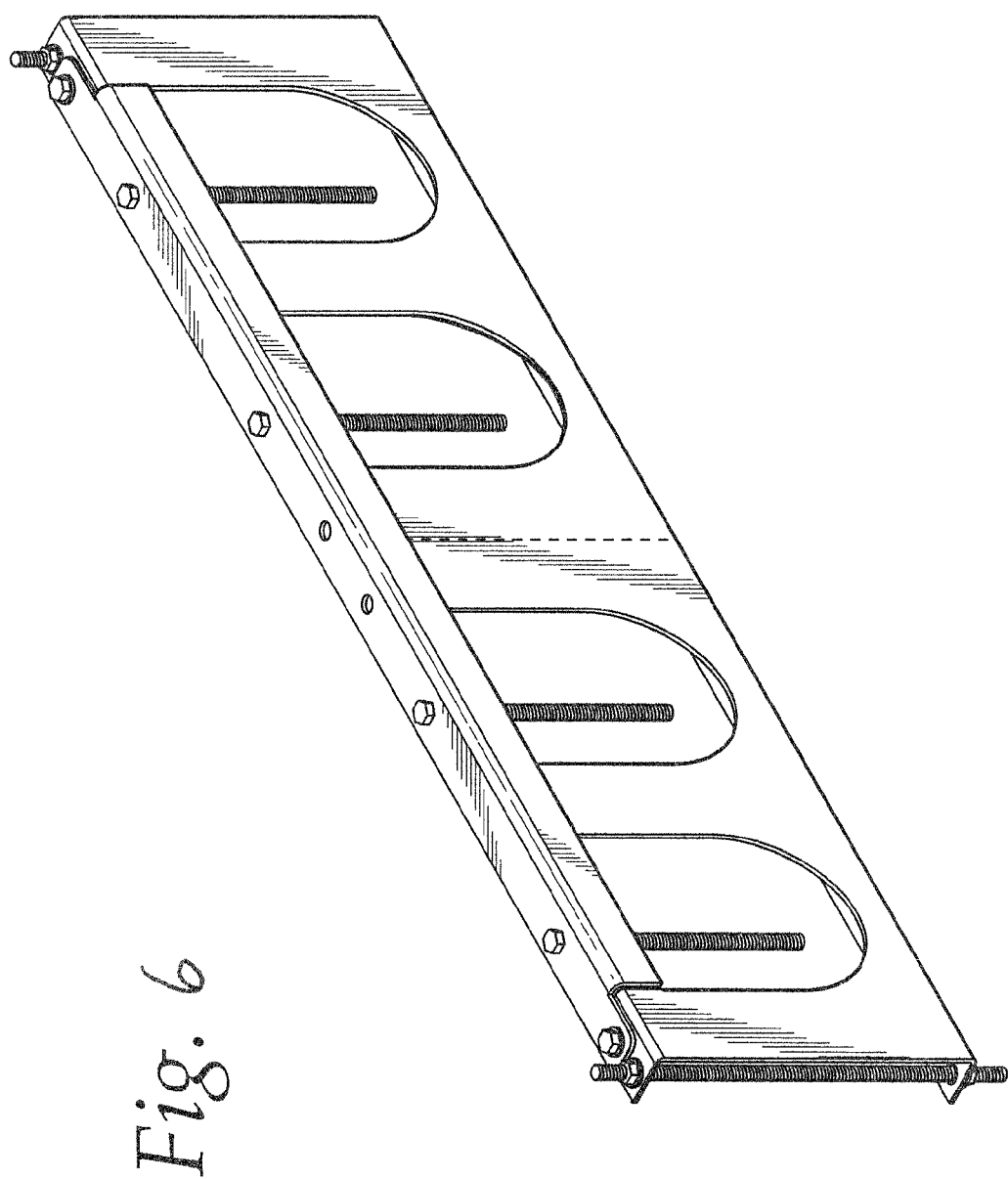
FIG. 6 is a further perspective view of the present conduit support system.
Figure 9:
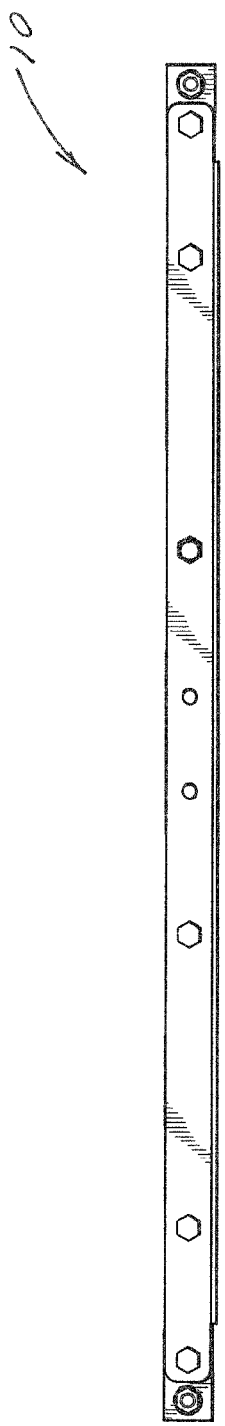
FIG. 9 is a top, plan view thereof.
Figure 10:
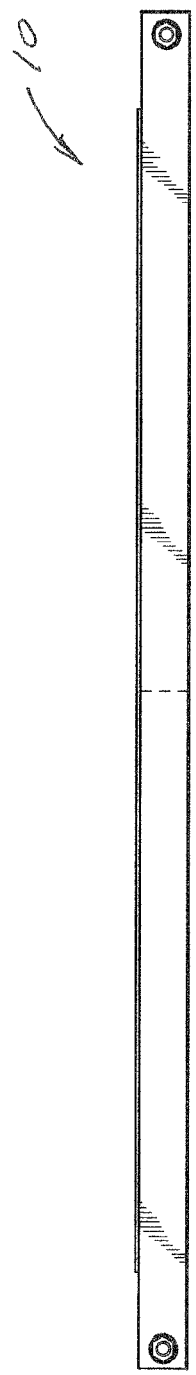
FIG. 10 is a bottom, plan view thereof.
Figure 12:
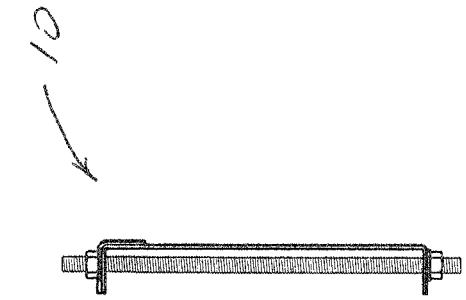
FIGS. 11 and 12 are opposite end elevational views thereof.
Figure 11:
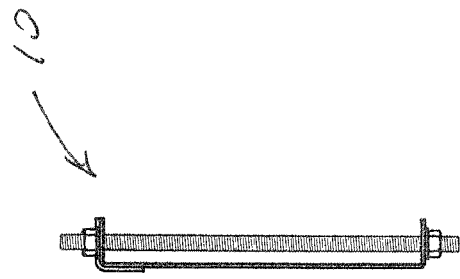

While the present invention is susceptible of embodiment in various forms, there is shown in the drawings, and will hereinafter be described a presently preferred embodiment, with the understanding that the present disclosure is to be considered as an exemplification of the invention, and is not intended to limit the invention to the specific embodiment illustrated.

With reference now to drawings, therein is illustrated a trapeze conduit support system 10 embodying the principles of the present invention. As will be further described, this type of conduit support system is frequently referred to as a "trapeze" arrangement, in that the system permits one or more conduits to be supported by a support bracket which extends in a trapeze-like fashion between a pair of associated vertically extending support members. This type of conduit support system finds applicability in many different buildings and like structures, where it is desired to support and position groups of conduits at or near the ceiling of the structure.

In accordance with the illustrated embodiment, the present conduit support system includes a conduit support bracket 12, and associated retention member 14 which can be movably fitted to the support bracket 12. In the preferred form, the retention member 14 is pivotally joined, at one end thereof, to one end of the support bracket 12. By this arrangement, the support bracket and the retention member can easily be preassembled for subsequent positioning on a pair of vertically extended support members 16, with associated conduit C thereafter retained in position in the support bracket 12.

Vertically extending support members 16 are typically provided in the form of threaded rods or like supporting structures, extending downwardly from a ceiling, beam, or like structural component of a building or other installation. Suitable nuts threaded to the vertically support members permit convenient mounting of the support bracket 12, and retention member 14, on the support members. As will be appreciated, the configuration of the support bracket and retention member permit plural ones of the support bracket and retention member to be vertically spaced along the pair of vertically extending members 16, thus permitting groups of the conduits C to be stacked, one upon the other.

The specific configuration of the support bracket 12 facilitates efficient fabrication, and convenient use for mounting of the conduits C. In the preferred form, portions of the support bracket 12 have a generally U-shaped cross-sectional configuration, including a central web portion 18, and a lower leg portion 20 extending along a bottom edge of the web portion 18. A plurality of upper leg portions 22 extend along upper edges of the web portion 18.

Disposition of the conduit C in the support bracket is facilitated by the provision of a plurality of laterally spaced opening 24 for respectively receiving the associated conduits. As will be noted, each of the openings 24 is respectively positioned between adjacent ones of the upper leg portions 22. The conduit openings are preferably of a generally U-shaped configuration, and are typically sized for receiving standard-sized conduits.

In accordance with the illustrated embodiments, the moveable retention member 14 has a generally L-shaped cross-sectional configuration, including a generally horizontal upper leg portion 30 arranged to overlie and abut upper leg portions 22 of the support bracket 12, with a generally downwardly extending lower leg portion arranged to generally abut web portion 18 of the support bracket. To facilitate convenient assembly, the retention member is preferably provided with a plurality of laterally spaced mechanical fasteners 32, which may be pre-threaded into the upper leg portion 30 of the retention member so that installers can conveniently secure the retention member 14 to the support bracket 12 after conduits have been positioned in the opening 24. As will be noted, suitable notches can be provided at opposite ends of the retention member 14, such as by removal of portions of upper leg portion 30, to permit plural ones of the support bracket 12 and retention member 14 to be stacked vertically along the vertically extending support members 16.

By selective movement of the retention member 14 with respect to conduit support bracket 12, convenient disposition of associated conduits C in the support bracket is facilitated. As will be observed, when the retention member 14 is pivotally secured at one end thereof to the support bracket, the retention member is movable from: (1) a first, open position wherein the plurality of conduits C can be selectively positioned in the laterally spaced openings 24 of the support bracket, and (2) a second, closed position wherein the retention member 14 overlies the conduit support bracket 12 to retain each of the conduits in position within a respective one of the laterally spaced openings 24. As will be noted from FIGS. 3 and 4, the retention member 14 can be pivotally joined to support bracket 12 at either end thereof.

In accordance with a presently preferred embodiment of the conduit support system, the retention member 12 can be provided with a plurality of adjustable locking elements 34 which can be adjusted to respectively engage the conduits C, when the retention member is in its second position with respect to the support bracket. The adjustable locking members extend through the upper leg portion 30 of the retention member, and may comprise suitable threaded mechanical fasteners to permit convenient threaded adjustment of the locking elements 34.

From the foregoing, use of the present conduit support system will be readily appreciated. As noted, the support system has a "trapeze-like" configuration by virtue of the arrangement of the support bracket 12 extending between the pair of vertically extending support members 16. The selectively moveable retention member 14 can be preassembled, for pivotal movement, on the support bracket 12, and the assembly suspended from the vertically extending support members 16.

With the retention member 12 in its first open position, the desired number of conduits C can be "laid in" and respectively positioned within the conduit opening 24 defined by the support bracket 12. Thereafter, the retention member 14 can be moved to its second position for retaining the conduits in position within the laterally spaced opening 24. Preferably, securement of each of the conduits C in the support bracket is effected by adjustment of the adjustable locking elements 34 which extend through the upper leg portion of the L-shaped retention bracket 14. Each of the adjustable locking elements 24 can be easily threadably adjusted downwardly into engagement with a respective one of the conduits C. This desirably acts to integrate the assembly with the associated conduits.

While the illustrated embodiment of the present support system has been shown in a configuration to accommodate four of the conduits C, it will be appreciated that the present system can be configured to conveniently carry and support any selective number of conduits. For added versatility, it may be desirable to configure the support bracket 12, arranged to accommodate four conduits, to be split or divided generally at cut line 36, thus permitting the bracket to be used to support but a pair of conduits. As will be noted, selective ones of the upper leg portions 22 of the support bracket can be provided with suitable openings for suspension from the pair of vertically extending support members 16.

From the foregoing, it will be observed that numerous modifications and variations can be effected without departing from the true spirit and scope of the novel concept of the present invention. It is to be understood that no limitations with respect to the specific embodiment disclosed herein are intended or should be inferred. The disclosure is intended to cover, by the appended claims, all such modifications as fall within the scope of the claims.

What is claimed is:

1. A trapeze conduit support system, comprising:
a pair of vertically extending support members;
a conduit support bracket extending between said pair of vertically extending support members, said conduit support bracket being suspended from said vertically extending support members at respective opposite ends of said conduit support bracket,
said conduit support bracket comprising a web portion defining a plurality of laterally spaced openings each for receiving a conduit; and
a retention member joined to said trapeze conduit support bracket for guided movement in a predetermined manner between: (1) a first, open position wherein said plurality of conduits can be selectively moved in a first direction to be positioned in said laterally spaced openings, and (2) a second, closed position wherein said retention member is situated to retain each of said conduits in position within a respective one of said laterally spaced openings by blocking movement of the conduits oppositely to the first direction.

2. The trapeze conduit support system in accordance with claim 1, wherein said retention member includes a plurality of adjustable locking elements which can be adjusted to respectively engage said conduits, in said second position of said retention member, for retaining said conduits in position within the respective openings defined by said web portion of said conduit support bracket.

3. The trapeze conduit support system in accordance with claim 2, wherein said retention member has an L-shaped cross-sectional configuration, including an upper leg portion on which said adjustable locking elements are adjustably mounted.

4. The trapeze conduit support system in accordance with claim 3, wherein each of said adjustable locking elements includes screw threads for vertical adjustment relative to said upper leg of said retention member.

5. The trapeze conduit support system in accordance with claim 3, wherein said trapeze conduit support bracket includes a lower leg portion extending along a bottom edge of said web portion of said conduit support bracket.

6. The trapeze conduit support system in accordance with claim 5, wherein said conduit support bracket includes a plurality of upper leg portions extending along an upper edges of said web portion, with each of said openings positioned between adjacent ones of said upper leg portions, said retention member overlying said upper leg portions in said second position of said movable retention member.

7. The trapeze conduit support system in accordance with claim 3, including a plurality of laterally spaced mechanical fasteners extending from said retention member into said upper leg portions for securing said retention member in said second position on said conduit support bracket.

8. The trapeze conduit support system in accordance with claim 7, wherein said retention member has an L-shaped cross-sectional configuration, and includes an upper leg portion through which said plurality of mechanical fasteners extend.

9. The trapeze conduit support system in accordance with claim 8, wherein said retention member includes a plurality of adjustable locking elements extending through said upper leg portion, said adjustable locking elements being adjustable to respectively engage said conduits, in said second position of said retention member, for retaining said conduits in position within the respective openings defined by said web portion of said conduit support bracket.

10. The trapeze conduit support system in accordance with claim 1, wherein said retention member includes a mechanical fastener at one end thereof for mounting said retention member on said trapeze conduit support bracket for pivotal movement of said retention member between said first and second positions with respect to said trapeze conduit support bracket.

11. A trapeze conduit support system, comprising:
a pair of vertically extending support members;
a conduit support bracket extending between said pair of vertically extending support members, said conduit support bracket being suspended from said vertically extending support members at respective opposite ends of said conduit support bracket,
said conduit support bracket comprising a web portion defining a plurality of laterally spaced openings each for receiving a conduit; and
a retention member configured and mounted for guided movement in a predetermined manner relative to the conduit support bracket between: (1) a first, open position wherein said plurality of conduits can be selectively moved in a first direction to be positioned in said laterally spaced openings, and (2) a second, closed position wherein said retention member is situated to retain each of said conduits in position within a respective one of said laterally spaced openings by blocking movement of the conduits oppositely to the first direction.

* * * * *